United States Patent
Schulbach et al.

(10) Patent No.: US 8,563,061 B2
(45) Date of Patent: Oct. 22, 2013

(54) METHOD OF INHIBITION OF ENZYMATIC BROWNING IN FOOD USING HYPOTAURINE AND EQUIVALENTS

(75) Inventors: Kurt F. Schulbach, Gainesville, FL (US); Diane Schulbach, legal representative, Gainesville, FL (US); Maurice R. Marshall, Gainesville, FL (US)

(73) Assignee: University of Florida Research Foundation, Inc., Gainesville, FL (US)

( * ) Notice: Subject to any disclaimer, the term of this patent is extended or adjusted under 35 U.S.C. 154(b) by 35 days.

(21) Appl. No.: 12/936,819

(22) PCT Filed: Apr. 21, 2009

(86) PCT No.: PCT/US2009/041245
§ 371 (c)(1), (2), (4) Date: Feb. 2, 2011

(87) PCT Pub. No.: WO2009/131996
PCT Pub. Date: Oct. 29, 2009

(65) Prior Publication Data
US 2011/0151077 A1   Jun. 23, 2011

Related U.S. Application Data

(60) Provisional application No. 61/046,622, filed on Apr. 21, 2008.

(51) Int. Cl.
- A23B 7/154 (2006.01)
- A21D 2/16 (2006.01)
- C07C 313/00 (2006.01)

(52) U.S. Cl.
USPC .......................... 426/269; 426/654; 562/126

(58) Field of Classification Search
None
See application file for complete search history.

(56) References Cited

U.S. PATENT DOCUMENTS

| | | | | |
|---|---|---|---|---|
| 5,271,951 | A * | 12/1993 | Ando | 426/655 |
| 5,601,806 | A * | 2/1997 | Katsumata et al. | 424/59 |
| 5,679,845 | A | 10/1997 | Ohsumi et al. | |
| 5,856,563 | A | 1/1999 | Ohsumi et al. | |
| 2006/0099232 | A1* | 5/2006 | Matsunami | 424/401 |

FOREIGN PATENT DOCUMENTS

| | | | |
|---|---|---|---|
| JP | 08-131065 | | 5/1996 |
| JP | 10-215837 | | 8/1998 |
| JP | 10215837 | A * | 8/1998 |
| KR | 10-0776289 | | 11/2007 |

OTHER PUBLICATIONS

Aruoma OI, Halliwell B, Hoey BM, Butler J. The antioxidant action of taurine, hypotaurine and their metabolic precursors. Biochem. J. (1988) 256, 251-255.*

(Continued)

*Primary Examiner* — Humera Sheikh
*Assistant Examiner* — Subbalakshmi Prakash
(74) *Attorney, Agent, or Firm* — Saliwanchik, Lloyd & Eisenschenk

(57) ABSTRACT

A method of inhibiting enzymatic browning in food involves the contacting of hypotaurine, a salt of hypotaurine or an equivalent of hypotaurine with the food. The hypotaurine can be provided from solution, an extract, or in solid form to a food that can loose its appeal to a consumer due to browning, such as cut fruits and vegetables, seafood, or a beverage. The antibrowning agent can be applied to the food by spraying, dusting, dipping, or dissolving, depending upon the form of the food to which the agent is added.

17 Claims, 1 Drawing Sheet

(56) References Cited

OTHER PUBLICATIONS

Yokoyama, M Cysteine Metabolism in Rainbow Trout. UJNR Technical Report No. 26; pp. 159-172; 1998.*

Yoshikawa T, Naito Y, Masui Y, Fuiji T, Boku Y, Yoshida N, and Kondo M. Antioxidant Properties of Crassostera gigas Oyster Extract. Chapter 30 in Antioxidant Food Supplemnts in Human Health. pp. 461-469. Academic Press 1999.*

Park Choon-Kyu. Comparison of Extractive Nitrogenous Constituents between the Diploid and the Triploid of Oyster Crassostrea gigas Whole Body. J. Fish. Tech. 2(2), pp. 135-136, 1999 (Abstract).*

Masato Higuchi, Fritzie T Celino, Ayako Tamai, Chiemi Miura, Takeshi Miura. The synthesis and role of taurine in the Japanese eel testis. Amino Acids. DOI 10.1007/s00726-011-1128-3. Published Online: Nov. 2, 2011.*

Toivonen PMA, Hampson C, Stan S. Apoplastic Levels of Hydroxyl Radicals in Four Different Apple Cultivars are Associated with Severity of Cut-Edge Browning. ISHS Acta Horticulturae 682: V International Postharvest Symposium; Abstract, (2005).*

Murata, M. et al., "Relationship between Apple Ripening and Browning: Changes in Polyphenol Content and Polyphenol Oxidase," *Journal of Agricultural and Food Chemistry*, May 1995, pp. 1115-1121, vol. 43, No. 5.

Yemenicioğlu, A. et al., "Heat Inactivation Kinetics of Apple Polyphenoloxidase and Activation of its Latent Form", *Journal of Food Science*, 1997, pp. 508-510, vol. 62, No. 3.

Awapara, J., "2-Aminoethanesulfinic Acid: An Intermediate in the Oxidation of Cysteine in vivo," J. Biol. Chem., 1953, pp. 183-188, vol. 203.

\* cited by examiner

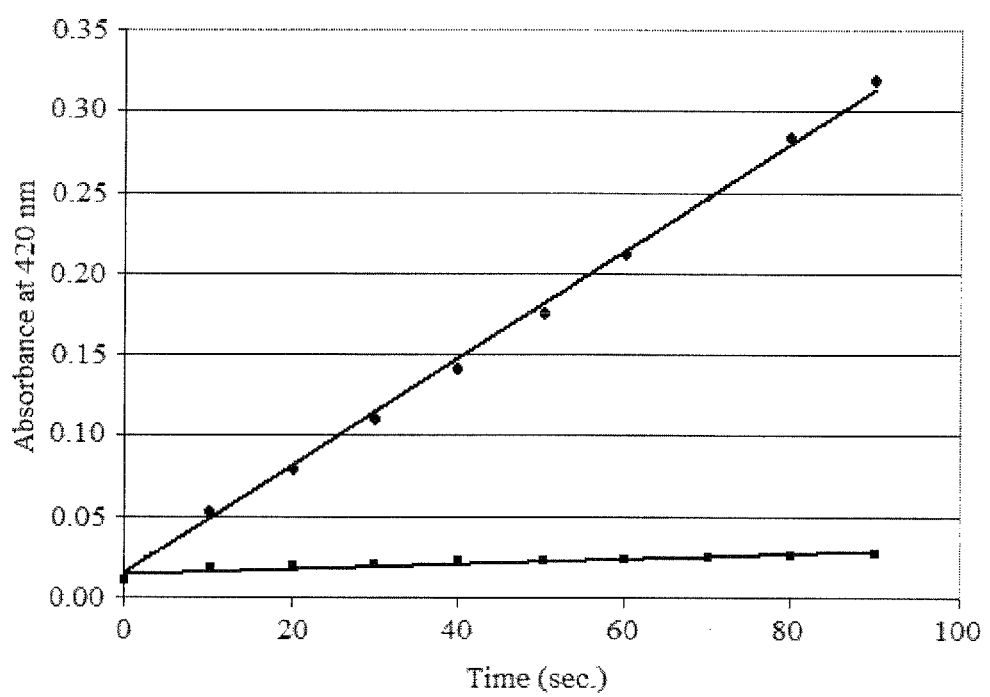

METHOD OF INHIBITION OF ENZYMATIC BROWNING IN FOOD USING HYPOTAURINE AND EQUIVALENTS

CROSS-REFERENCE TO RELATED APPLICATIONS

This application is the U.S. national stage application of International Patent Application No. PCT/US2009/041245, filed Apr. 21, 2009, which claims the benefit of U.S. Provisional Application Ser. No. 61/046,622, filed Apr. 21, 2008, the disclosures of which are hereby incorporated by reference in their entireties, including any figures, tables, or drawings.

BACKGROUND OF THE INVENTION

When selecting foods, a consumer typically considers its appearance, flavor, texture and nutritional value. Of these four attributes, it is often only the appearance that can be employed for the selection of the food product. The appearance is particularly impacted by the observed color. For many foods the favorable color is typically that from naturally occurring pigments such as chlorophylls, carotenoids and anthocyanins in a food as displayed in its mature state freshly removed from the environment that it naturally matures, such as freshly picked ripe fruit or freshly caught seafood. With the progression of time, the color can change by the inclusion or substitution of pigments resulting from both enzymatic and non-enzymatic reactions. Enzymatic browning is one of the most important color reactions that affect fruits, vegetables and seafood. This browning is catalyzed by the enzyme polyphenol oxidase (PPO) (1,2 benzenediol; oxygen oxidoreductase, EC1.10.3.1), which is a copper-containing enzyme that catalyzes the oxidation of o-diphenols to o-quinones. PPO is also referred to as phenoloxidase, phenolase, monophenol oxidase, diphenol oxidase and tyrosinase. Browning not only affects color, but can also adversely affect flavor and nutritional value.

Projected increases in fruit and vegetable markets require that enzymatic browning be understood and, more importantly, controlled. Enzymatic browning is devastating to the distribution of many exotic fruits and vegetables, particularly that of tropical and subtropical products. It has been estimated that more than 50 percent of losses during fruit distribution occur because of enzymatic browning. In addition to tropical and subtropical fruits and vegetables, products as diverse as lettuce, potatoes, sweet potato, breadfruit, yam, mushrooms, apples, avocados, bananas, grapes, and peaches are susceptible to significant losses during distribution due to browning. The closer to purchase by the consumer that browning occurs, the greater the economic losses incurred due to the storage and handling costs prior to this point in the distribution process. Therefore, controlling browning from harvest to consumer is critical for the maintenance of economic value to the agriculturist and food processor.

Polyphenol oxidases are believed to be important to the prevention of insects and microorganisms from attacking plants and are involved in the wound response of plants and plant products to insects, microorganisms and bruising. A fruit or vegetable's susceptibility to disease and infestation increases as it ripens because of a decline in its phenolic content. Phenoloxidase enzymes, endogenous to fruits and vegetables, catalyze production of quinones from phenolic constituents. These quinones subsequently undergo polymerization reactions that produce melanins, which exhibit both antibacterial and antifungal activity and assist in keeping the fruit and/or vegetable physiologically wholesome. Research on the antibacterial, anticancer and antioxidant nature of melanins has triggered considerable interest in enzymatic browning and has led to nutritional recommendations for increased consumption of fruits and vegetables. Convenience forms of these foods are particularly susceptible to enzymatic browning. Enzymatic browning does not occur in intact plant cells since phenolic compounds in cell vacuoles are separated from the polyphenol oxidase in the cytoplasm. Upon slicing, cutting, grating, pulping, or juicing, brown pigments form. The organoleptic and biochemical characteristics of fruits and vegetables are altered by pigment formation. The rate of enzymatic browning in fruit and vegetables is governed by the active polyphenol oxidase content of the tissues, the phenolic content of the tissue, pH, temperature and oxygen availability within the tissue. Attempt to control enzymatic browning have focused of the elimination of one or more of these governing factors.

Temperature control of browning is carried out by heating, blanching, or cooling, by refrigeration or freezing. Blanching is nutritionally disadvantageous, resulting in losses in vitamins, flavors, colors, texture, carbohydrates and other water-soluble components. Blanching is also technically disadvantageous as it requires large amounts of water and energy and typically has waste disposal costs. Refrigeration adds costs throughout the distribution and retailing process, but is commonly employed for the prevention of browning in fruit, vegetables, and seafood. Freezing causes changes in texture and other freshness characteristics and cm also lead to decompartmentalization of certain enzymes, substrates, and/or activators by cell disruption facilitating enzyme activity upon thawing of the food.

Other treatments include dehydration, irradiation, high pressure treatment, super critical $CO_2$ treatment, ultrafiltration and ultracentrifugation. Of these methods, dehydration affects the texture and flavor of food, irradiation requires high levels of radiation to denature the polyphenol oxidase enzyme, super critical $CO_2$ requires processing at pressures in excess of 50 atmospheres yet polyphenol oxidase is highly pressure resistant, and ultrafiltration and ultracentrifugation are processes that are effective only for liquids that effect the nutritional value and require significant processing costs. For these reasons such methods do not provide a general cost effective method to control enzymatic browning.

Enzymatic browning has been addressed primarily by the use of chemical inhibiting agents. Such inhibitors can target the enzyme, the substrates (oxygen and polyphenols) or the brown products of the reaction. Inhibitors that act directly on polyphenol oxidase are often classified as members of two groups. The first group consists of metal ion chelators, and includes azide, cyanide, carbon monoxide, halide ions and tropolone. The second group of inhibitors consists of aromatic carboxylic acids of the benzoic and cinnamic series which behave as competitive inhibitors of polyphenol oxidase by their structural similarity with phenolic substrates.

Substrate inhibitors remove either the oxygen or the phenolic substrate. The removal of oxygen can result in the promotion of anaerobic metabolic reactions in the food that can lead to breakdown with adverse effects on the flavor of the foods. Specific adsorbents can be used to remove phenolic compounds from foods. For example, cyclodextrins have been use for the removal of phenolic compounds from raw fruit and vegetable juices. Enzymatic modification of phenolic substrates has been examined for inhibition of polyphenol oxidase activity, however the cost of these enzymes is considered prohibitive towards the commercial development of this method. The products of diphenol oxidation, O-quinones, form dimers of the original phenol, which subsequently oxidize to form oligomers with varying color intensities. Ascorbic acid, thiol compounds, sulphites, and amino acids have displayed the capability of inhibiting dimer formation and oxidation, by reducing O-quinones to O-diphenols, or by formation of colorless addition products.

The use of browning inhibitors in food is restricted by considerations relevant to toxicity, wholesomeness, and their effect on taste, texture, and cost. Browning inhibitors have been classified by their primary mode of action as: (1) reducing agents; (2) acidulants; (3) chelating agents; (4) complexing agents; (5) enzyme inhibitors; and (6) enzyme treatments. Sulphites, considered reducing agents, are the most widely used inhibitors of enzymatic browning. Sulfites are subject to regulatory restrictions because of potential adverse health effects. Many reports have described allergic reactions in humans following the ingestion of sulphite-treated foods, frequently by hypersensitive asthmatics. Sulphites levels in food processing are based on their theoretical yields of sulfur dioxide. The Joint Expert Committee on Food Additives (JECFA) of the World Health Organization (WHO) and the Food and Agriculture Organization (FAO) recommend sulphite daily intake be limited to less than 0.7 mg sulphur dioxide per kg of body weight, and significant effort is being made to identify appropriate substitutes. Other widely used inhibitors include: reducing agents such as ascorbic acid, erythorbic acid, cysteine, synthetic antioxidants (such as butylated hydroxyanisole (BHA), butylated hydroxytoluene (BHT), tertiarybutyl hydroxyquinone (TBHQ) and propyl gallate (PG)), and plant based phenolic compounds (such as tocopherols, flavonoid compounds, cinnamic acid derivatives, and coumarins); acidulants such as citric, malic, and phosphoric acids; chelators such as sorbic acid, polycarboxylic acids (citric, malic, tartaric, oxalic, and succinic acids), polyphosphates (ATP and pyrophosphates), macromolecules (porphyrins, proteins), and EDTA; and enzyme inhibitors such as aromatic carboxylic acids, substituted resorcinols, halide salts, honey, amino acids, and proteins.

The search for effective affordable browning inhibitors continues. Inhibitors that are beneficial or, at least, non-toxic, and can be used at sufficient levels without adversely affecting the sensory characteristic of the foods, yet are cost effective, remain a need in the evolving food industry.

BRIEF SUMMARY OF THE INVENTION

The invention involves a method of inhibiting enzymatic browning in a food where hypotaurine, a salt of hypotaurine, or an equivalent of hypotaurine can be provided as an agent and contacted with a food that would otherwise undergo enzymatic browning. The agent can be provided in a solution, for example an aqueous solution, or as a solid. An equivalent of hypotaurine can be an extract of a foodstuff that has a high hypotaurine level such clam, oyster, mussels, squid, octopus, or any combination thereof. The agent can be provided at a level of 500 ppm of hypotaurine or less in the food to avoid browning where a level of less than 100 ppm is generally sufficient.

The agent can be contacted with the food by spraying, dipping, or dusting said agent onto surfaces of the food. Contacting can be carried out by dissolving the agent in the food. The food can be freshly cut, ground, sliced, grated, pulped or otherwise processed vegetable or fruit. The agent can be added to inhibit browning of a beverage such as wine.

BRIEF DESCRIPTION OF THE DRAWINGS

FIG. 1 is a plot of the rate of yellow color formation by the action of apple polyphenol oxidase on catechol in the presence (■) and absence (●) of hypotaurine.

DETAILED DESCRIPTION OF THE INVENTION

The present invention is directed to the use of hypotaurine (2-aminoethane sulfinate), or its equivalent, as an inhibitor of enzymatic browning in foods. In one embodiment of the invention hypotaurine is added to vegetable or fruit surfaces exposed by cutting, grinding, slicing, grating, pulping or other processing to inhibit the rate of browning at the surface exposed by the processing. In one embodiment of the invention, hypotaurine can be delivered to a food from aqueous solution. Hypotaurine has a water solubility of about 100 mg/mL. In another embodiment of the invention, hypotaurine can be added as a solid to a liquid food, such as a vegetable or fruit juice, wine or other beverage. In another embodiment of the invention, hypotaurine can be added to shrimp or other seafood to inhibit browning.

Hypotaurine is a natural compound formed by catabolism of cysteine where the mammalian enzyme cysteine dioxygenase CDO converts cysteine to cysteine sulfinic acid followed by decarbonylation to hypotaurine (2-aminoethane sulfinic acid), which can be subsequently oxidized to taurine. Hypotaurine can be produced synthetically. One method is disclosed in Ohsumi et al. U.S. Pat. No. 5,856,563 and Ohsumi et al. U.S. Pat. No. 5,679,845 as an industrially viable process. In one embodiment of the invention the antibrowning agent hypotaurine is included as a purified solid. In another embodiment of the invention the hypotaurine can be in the form of an equivalent, including a salt of hypotaurine. In one embodiment, a hypotaurine salt can be in the form of an alkali or alkali-earth metal 2-aminoethane sulfinate salt. In another embodiment, the hypotaurine salt can be in the form of an ammonium salt of 2-aminoethane sulfinic acid. In another embodiment of the invention, a hypotaurine salt can be in the form of a 2-ammoniumethane sulfinic acid salt of a strong acid, for example as a salt of hydrochloric acid. The equivalents of hypotaurine can be employed with a food that is capable of converting the equivalent to hypotaurine and in some instances result in the conversion of the equivalent over an extended period of time. Equivalents of hypotaurine can be any precursor to hypotaurine that can generate hypotaurine readily upon contact with the food, or can be an analog of hypotaurine that is non-toxic and can inhibit browning, yet does not generate hypotaurine upon contact with the food. Hypotaurine equivalent include cysteine sulfinic acid and mono and di N-substituted hypotaurine where the alkyl or, independently, alkyl groups are C1 to C8 alkyl which can be straight chained or branched. Other hypotaurine equivalents that can be employed for the inhibition of browning are C3-C8 alkyl sulfinic acids.

In another embodiment of the invention, hypotaurine can be provided as a component of an extract from a foodstuff that contains significant amounts of hypotaurine. Foodstuff high in hypotaurine includes clam, oyster, mussels, squid, and octopus. As hypotaurine is a small molecule, it can be separated with other small molecule components of appropriate foodstuff from cells, proteins and other large molecules by a variety of methods practiced by those skilled in the art. Methods such as microfiltration, nanofiltration, ultrafiltration, size exclusion chromatography, affinity chromatography, ion-exchange chromatography and a host of other methods can be used, separately or in combination, depending upon the nature of the hypotaurine extract source.

A solid food, to be contacted with hypotaurine, or its equivalent, for browning inhibition can be dipped or otherwise submerged in a solution containing hypotaurine, sprayed with an aerosol containing the hypotaurine in solution, or dusted with a solid containing hypotaurine. When solutions are used the solvent can be water or any ingestible solvent, for example ethanol or a vegetable oil. The viscosity of the solution containing hypotaurine, or its equivalent, can be thickened using any natural or synthetic thickener, including starches, sugars, or polyethyleneoxides. For a liquid food, such as a juice, wine or other beverage, solid hypotaurine, or its equivalent, can be dissolved in the liquid at low levels such that no significant alteration of the taste or other sensory factors occurs upon addition. The concentration of hypotaurine or its equivalent on or within a food contacted can be less than 500 ppm based on the weight of hypotaurine. For example hypotaurine or its equivalent can be 400, 300, 250, 200, 150, 100, 90, 80, 70, 60, 50, 40, 30, 25, 20, 15, or 10 ppm by weight of the food after inclusion.

When a contacting solution is used, the solution can contain any concentration of hypotaurine or its equivalent that permits the contacted food to display a desired level of hypotaurine or its equivalent. For example, an aqueous solution can be saturated in hypotaurine or its equivalent at a temperature of contacting, or can be contained at a lower concentration that allows a sufficient level of hypotaurine to be achieved on or within the food. For example, a normal room temperature solution, about 25° C., can have a hypotaurine concentration of about 100 mg/mL or less. A solution of about 100° C. can be used where the hypotaurine concentration is much higher, for example 200 mg/mL and the food can be partially or fully blanched while contacting with the hypotaurine solution. By use of a very volatile solvent, a hypotaurine equivalent can be contacted by a solution where the solvent does not persist in the food. For example, a hypotaurine equivalent can be dissolved in ethanol.

In one embodiment of the invention, hypotaurine, or its equivalent, can be used in conjunction with a second chemical additive for the inhibition of browning. For example, hypotaurine can be used in combination with sulfites, such that the sulfite level can be maintained at or below an acceptable level of safety. For example, sulfite levels can be below the level of 10 ppm that requires warnings on a food label, with hypotaurine included at a level where the combination inhibit browning, but the two agents would not if used separately at these levels. Hypotaurine can be included with ascorbic acid, erythorbic acid, cysteine, synthetic antioxidants (such as butylated hydroxyanisole (BHA), butylated hydroxytoluene (BHT), tertiarybutyl hydroxyquinone (TBHQ) and propyl gallate (PG)), and plant based phenolic compounds (such as tocopherols, flavonoid compounds, cinnamic acid derivatives, and coumarins); acidulants such as citric, malic, and phosphoric acids; chelators such as sorbic acid, polycarboxylic acids (citric, malic, tartaric, oxalic, and succinic acids), polyphosphates (ATP and pyrophosphates), macromolecules (porphyrins, proteins), and EDTA; and enzyme inhibitors such as aromatic carboxylic acids, substituted resorcinols, halide salts, honey, amino acids, and proteins.

The presence of the hypotaurine, or its equivalent that can generate hypotaurine, can provide additional nutritional benefits to the food, either by the presence of hypotaurine, or of taurine that is generated from the hypotaurine by enzymes in individuals consuming the food that was treated with the antibrowning agent. Particularly for vegans who consume fruits and vegetables treated by the hypotaurine antibrowning agent of the present invention, taurine levels can be supplemented, as vegans have been found to have significantly lower taurine levels in plasma and urine, 78 and 29 percent, respectively, of that in a control group that consumed a standard American diet. Taurine is associated with a number of benefits upon supplementation. Low taurine levels are associated with retinal dysfunction in adults. Taurine prevents obesity in mice fed a high-fat, low-taurine diet. Taurine favorably influences defects in nerve blood flow, motor nerve conduction velocity, and nerve sensory thresholds in diabetic neuropathic rats. Taurine promotes weight loss and decreases blood sugar in diabetic rats. Taurine produces an anxiolytic-like effect in mice and is believed to act as a modulator or anti-anxiety agent in the central nervous system. Taurine has become a common ingredient in energy drinks and is frequently used in combination with bodybuilding supplements due to findings in mice that taurine alleviates muscle fatigue in strenuous workouts and raises exercise capacity.

Materials And Methods

Materials

Hypotaurine was purchased from Sigma Aldrich, St. Louis, Mo., USA.

Acetone powder containing apple polyphenol oxidase was prepared from Red Delicious apples. Cored and peeled apple pieces (200 g) were homogenized in a precooled blender along with 400 mL cold acetone (−20° C.) for 1 min and then filtered through Whatman No. 1 filter paper. The residue was extracted 3 times with 200 mL cold acetone and the resulting white powder was dried at room temperature, vacuum sealed in commercial plastic bags, and stored at −20° C. until needed. Crude PPO enzyme from the acetone powder was reconstituted in 0.1 M $KH_2PO_4/Na_2HPO_4$, pH 7.2 Containing 1% Triton X-100 (Bio-Rad Laboratories, Hercules, Calif.) using modified procedures of Murata et al. "Relationship between apple ripening and browning—changes in polyphenol content and polyphenol oxidase", *Journal of Agricultural and Food Chemistry* 1995, 43 (5), 1115-21 and Yemenicioglu et al. "Heat inactivation kinetics of apple polyphenoloxidase and activation of its latent form", *Journal of Food Science* 1997, 62 (3): 508-10. Acetone powder (1 g) was added to 50 mL of refrigerated 0.1 M $KH_2PO_4/Na_2HPO_4$, pH 7.2 buffer containing 1% TritonX-100 (Bio-Rad Laboratories, Hercules, Calif.) and the mixture was stirred for 20 min at 4° C. The suspension was centrifuged at 1200×g for 30 min, then filtered through glass wool and stored at −20° C. where it remained stable for at least 1 month.

Hypotaurine Extract

Frozen mussels, farm-raised in Canada were thawed and the free liquid was retained. Following filtration, the extract was dialyzed using Spectra/Por CE 500 MWCO membrane (Spectrum Labs. Inc., Rancho Dominguez, Calif.) with 3 changes of distilled water over a 24 hr period. Following dialysis, the extract was filtered through a 0.45 µm nylon membrane filter and then 30 mL aliquots were applied to a 38.5×2.5 cm Sephadex G-25-80 size-exclusion column (Sigma, St. Louis, Mo.) using 0.02 M phosphate buffer, pH 5.7 as the mobile phase. The active fraction was collected and freeze-dried to concentrate the inhibitor. Just prior to an experiment, freeze dried inhibitor was reconstituted with DI water to one-sixth original volume. The presence of hypotaurine was confirmed by mass spectroscopy.

Evaluation of Browning Inhibition

A standard reaction mixture for evaluation of browning inhibition where the hypotaurine comprising solution was a mussel extract, consisted of 2.45 mL of 0.1 sodium acetate/ acetic acid buffer, pH 5.5, 0.2 ml mussel extract (or additional pH 5.5 buffer for a control run for comparison), 0.3 mL of 0.5 M catechol (Sigma, St. Louis, Mo.) and 0.05 mL of enzyme extract. The percent inhibition was calculated with the following formula: I=100*(A−B)/A, where A and B are the initial rate of the control and the test system respectively.

Hypotaurine Activity

Polyphenol oxidase activity was measured by monitoring the increase in yellow color (absorbance at 420 nm) in a reaction mixture with catechol as a substrate. FIG. 1 shows the rapid increase in color formation in the control sample and very slow color formation when hypotaurine was added to the reaction mixture. From the data in FIG. 1, the inhibition of polyphenol oxidase by 90 ppm of hypotaurine was calculated to be 97 percent with a 30 fold decrease in the rate of browning. The mussel extract was employed in a similar manner and inhibition was calculated to be 93 percent with a 14 fold decrease in the rate of browning.

Although not limited by the mechanism of browning inhibition, the reduction in color formation in the reaction mixture appears to be at least partially due to the inhibition of the polyphenol oxidase enzyme. Using the mussel extract that contained high levels of hypotaurine, oxygen levels in a reaction mix containing catechol and the mussel extract consumed significantly less oxygen, suggesting that at least one mode of inhibition was enzyme inhibition, as the enzyme consumes oxygen during the conversion of catechol to o-quinone. Oxygen consumption was monitored using the OxyMicro oxygen meter. The addition of the mussel extract to the reaction mixture lowered the slope of the oxygen consumption curve from −0.914 to −0.652, clearly indicating that the mussel extract was inhibiting the enzyme. Hypotaurine can also provide inhibition of color by forming colorless addition products with highly reactive quinones in addition to enzyme inhibition. The addition products of hypotaurine with quinones can inhibit degradation of anthocyanins pigments, in addition to inhibiting browning.

All patents, patent applications, provisional applications, and publications referred to or cited herein, supra or infra, are incorporated by reference in their entirety, including all figures and tables, to the extent they are not inconsistent with the explicit teachings of this specification.

It should be understood that the examples and embodiments described herein are for illustrative purposes only and that various modifications or changes in light thereof will be suggested to persons skilled in the art and are to be included within the spirit and purview of this application.

We claim:

1. A method of inhibiting enzymatic browning in a food or beverage comprising the steps of:
    providing an agent comprising hypotaurine, a salt of hypotaurine, or an equivalent of hypotaurine; and
    contacting said food or beverage with said agent, wherein said hypotaurine, salt of hypotaurine, or equivalent of hypotaurine is 10 to 400 ppm of the food after said contacting, based on the weight of said hypotaurine, hypotaurine from said salt of hypotaurine, or hypotaurine that can be converted from said eqivalent of hypotaurine, wherein said agent is a liquid, solid, or solid suspended in a liquid, and wherein contacting comprises spraying or dusting said agent onto one or more surfaces of said food, dipping said food in said agent, or adding or dissolving said agent in said beverage.

2. The method of claim 1, wherein said agent is a solution.

3. The method of claim 2, wherein said solution is an aqueous solution.

4. The method of claim 1, wherein said agent is a solid.

5. The method of claim 1, wherein said agent comprises said hypotaurine, salt of hypotaurine, or equivalent of hypotaurine in an extract of a foodstuff.

6. The method of claim 5, wherein said foodstuff is clam, oyster, mussels, squid, octopus, or any combination thereof.

7. The method of claim 1, wherein said level is less than 100 ppm of said food.

8. The method of claim 1, wherein said step of contacting is spraying, dipping, or dusting said agent onto surfaces of said food.

9. The method of claim 1, wherein said step of contacting is dissolving said agent in said food.

10. The method of claim 1, wherein said food is a freshly cut, ground, grated, pulped or processed vegetable or fruit.

11. The method of claim 1, wherein said food is a beverage.

12. The method of claim 11, wherein said beverage is wine.

13. The method of claim 1, wherein said agent further comprises at least one second enzymatic browning inhibitor.

14. The method of claim 13, wherein said second enzymatic browning inhibitor is selected from a sulfite, ascorbic acid, erythorbic acid, cysteine, butylated hydroxyanisole (BHA), butylated hydroxytoluene (BHT), tertiarybutyl hydroxyquinone (TBHQ), propyl gallate (PG), tocopherol, a flavonoid compound, a cinnamic acid derivative, coumarin, citric acid, malic acid, phosphoric acid, sorbic acid, tartaric acid, oxalic acid, succinic acid, ATP, pyrophosphate, a porphyrin, EDTA, an aromatic carboxylic acid, a substituted resorcinol, a halide salt, honey, or an amino acid.

15. An agent comprising hypotaurine, a salt of hypotaurine, or an equivalent of hypotaurine at a concentration of 100 mg/mL to saturation within a liquid or a suspension, wherein the agent inhibits enzymatic browning upon contacting a surface of a foodstuff or upon dissolving in a beverage.

16. The agent of claim 15, wherein said hypotaurine, salt of hypotaurine, or equivalent of hypotaurine is from an extract of a foodstuff.

17. The agent of claim 15, further comprising at least one additional enzymatic browning inhibitor, wherein said additional enzymatic browning inhibitor is selected from a sulfite, ascorbic acid, erythorbic acid, cysteine, butylated hydroxyanisole (BHA), butylated hydroxytoluene (BHT), tertiarybutyl hydroxyquinone (TBHQ), propyl gallate (PG), a tocopherol, a flavonoid compound, a cinnamic acid derivative, coumarin, citric acid, malic acid, phosphoric acid, sorbic acid, tartaric acid, oxalic acid, succinic acid, ATP, pyrophosphate, a porphyrin, EDTA, an aromatic carboxylic acid, a substituted resorcinol, a halide salt, honey, or an amino acid.

* * * * *